(12) United States Patent
Hernandez, IV et al.

(10) Patent No.: US 8,770,227 B2
(45) Date of Patent: Jul. 8, 2014

(54) FLOW DIVERTER VALVE

(76) Inventors: Luciano Hernandez, IV, Holland, MI (US); Mike Zamora, Plainwell, MI (US); Nancy Wall, Grandville, MI (US); Ron Duis, Plainwell, MI (US); Jim Medsker, Lawton, MI (US)

( * ) Notice: Subject to any disclaimer, the term of this patent is extended or adjusted under 35 U.S.C. 154(b) by 113 days.

(21) Appl. No.: 13/557,634

(22) Filed: Jul. 25, 2012

(65) Prior Publication Data

US 2014/0026998 A1 Jan. 30, 2014

(51) Int. Cl.
*F16K 11/074* (2006.01)
*F16K 5/00* (2006.01)

(52) U.S. Cl.
USPC ...................................... 137/625.46; 137/887

(58) Field of Classification Search
USPC .................. 137/625.46, 887, 625.15, 625.16; 604/32
See application file for complete search history.

(56) References Cited

U.S. PATENT DOCUMENTS

| | | | | |
|---|---|---|---|---|
| 3,191,628 A | * | 6/1965 | Kirkwood et al. | 137/625.43 |
| 3,658,093 A | * | 4/1972 | Kirkwood | 137/625.43 |
| 4,802,506 A | * | 2/1989 | Aslanian | 137/556 |
| 5,288,290 A | * | 2/1994 | Brody | 604/32 |
| 5,848,611 A | * | 12/1998 | Stanevich | 137/625.47 |
| 5,988,219 A | * | 11/1999 | Larsen | 137/625.43 |
| 2009/0308242 A1 | * | 12/2009 | Choi et al. | 91/418 |
| 2010/0319796 A1 | * | 12/2010 | Whitaker | 137/625.46 |

* cited by examiner

*Primary Examiner* — Elizabeth Houston
*Assistant Examiner* — Michael R Reid
(74) *Attorney, Agent, or Firm* — The Watson I.P. Group, PLC; Jovan N. Jovanovic; Vladan M. Vasiljevic

(57) ABSTRACT

A flow diverter which is well suited for use in the medical environment to direct an inflow of various fluids (such as air and oxygen among others) to one of two (or more separate outlets. The diverter has a minimal amount of components and relies on a minimal amount of seals to effectuate a full diversion of flow between two outlets. The flow diverter 10 includes outer housing 12, flow selector valve 14 and seal members 16. The seal members are positioned so that one of the seal members is positioned within a non-planar groove on the selector valve.

14 Claims, 6 Drawing Sheets

FLOW DIVERTER VALVE

BACKGROUND OF THE DISCLOSURE

1. Field of the Disclosure

The disclosure relates in general to medical equipment, and more particularly, to a flow diverter valve, and one that is well suited to medical applications.

2. Background Art

The use of flow diverters is known in the art. Flow diverters can be utilized to divert an inlet stream to a plurality of different outlet openings. While such flow diverters are prevalent in the art, there are nevertheless problems associated with such diverters.

Among other problems, it is often the case that flow diverters of the prior art are cumbersome and have a multitude of parts, thereby complicating assembly. In addition, other flow diverters rely on complicated specialty seals to effectuate the sealing structure within the diverter body. Still other diverters have limited use due to their cost.

It is an object of the present invention to provide a simplified configuration of a flow diverter valve.

It is another object of the present invention to provide a flow diverter valve that utilizes a non-planar groove for accepting a seal member.

It is another object of the invention to provide a flow diverter valve that relies upon a simple actuation between outlets.

These objects as well as other objects of the present invention will become apparent in light of the present specification, claims, and drawings.

SUMMARY OF THE DISCLOSURE

The disclosure is directed to a flow diverter comprising an outer housing, a flow selector valve and a seal member. The outer housing includes a body which has a hooplike configuration with an inner surface spanning from a front edge to a back edge. The body defines an operational cavity which is bound by the inner surface and the front edge and back edge. An inlet opening extends through the inner surface and into the operational cavity. A first outlet opening extends through the inner surface and into the operational cavity. A second outlet opening extends through the inner surface and into the operational cavity. The inlet opening, the first outlet opening and the second outlet opening being radially spaced apart from each other.

A flow selector valve is positionable within the operational cavity and rotatable relative to the outer housing within the operational cavity about an axis that is generally orthogonal to the inner surface of the body. The flow selector includes an outer surface, an upper groove and a lower non-planar groove. The outer surface shape matingly engages the inner surface of the body in a close abutment. The upper groove extends into the inner surface of the body proximate a proximal end thereof. The lower non-planar groove extends into the inner surface of the body. The non-planar groove has a lower portion positioned proximate a distal end of the body, an upper portion positioned proximate the upper planar groove, and opposing transition portions transitioning between the upper portion and the lower portion.

The upper groove and the lower non-planar groove define an upper diverter channel which is rotationally positionable in at least a first orientation and a second orientation. In the first orientation, the second outlet opening and the inlet opening are each in fluid communication with the diverter channel, and the first outlet opening is fluidly isolated therefrom. In the second orientation, the inlet opening and the first outlet opening are in fluid communication with the diverter channel, and the second outlet opening is fluidly isolated therefrom.

The upper seal member is positioned within the upper planar groove, and a lower seal member positioned within the lower non-planar groove. Both of the seals sealingly engaging the inner surface of the outer housing.

In a preferred embodiment, the upper portion and the lower portion of the lower seal are substantially parallel to the upper seal, which is substantially planar.

In another preferred embodiment, the upper portion of the lower non-planar groove merges with a portion of the upper groove.

In a preferred embodiment, the upper seal and the lower seal each comprise o-rings.

In another preferred embodiment, the inlet opening is spaced approximately 180° from the second outlet opening and spaced approximately 90° from the first outlet opening.

In another preferred embodiment, the flow selector valve includes a top cap having a selector grip which facilitates the rotation thereof relative to the outer housing. The selector grip has an indicator as to which of the first outlet opening and the second outlet opening is in fluid communication with the inlet opening.

In another preferred embodiment, each of the inlet opening, first outlet opening and second outlet opening each include a fitting associated therewith. Each fitting provides a coupling with an outside device.

In a preferred embodiment, each fitting has a different configuration.

In a preferred embodiment, the flow selector is rotated approximately 90° between the first orientation and the second orientation.

Preferably, the body includes an outer surface that comprises a spherical segment, substantially centered about the midpoint between the front edge and the back edge.

In a preferred embodiment, the body further includes a flange positioned proximate the back edge. The flow selector valve includes at least one retaining clip which engages with the flange so as to maintain the flow selector valve within the operating cavity of the outer housing.

In another preferred embodiment, the body further includes an inner stop which cooperates with the slot to limit rotation of the flow selector valve relative to the outer housing between the first orientation and the second orientation.

In another preferred embodiment, the inner surface is substantially cylindrical with the outer surface of the flow selector valve being substantially cylindrical.

In another such preferred embodiment, the inlet opening, the first outlet opening and the second outlet opening are positioned substantially midway between the front edge and the back edge of the inner surface of the outer housing.

BRIEF DESCRIPTION OF THE DRAWINGS

The disclosure will now be described with reference to the drawings wherein.

DETAILED DESCRIPTION OF THE DISCLOSURE

Figure 1:
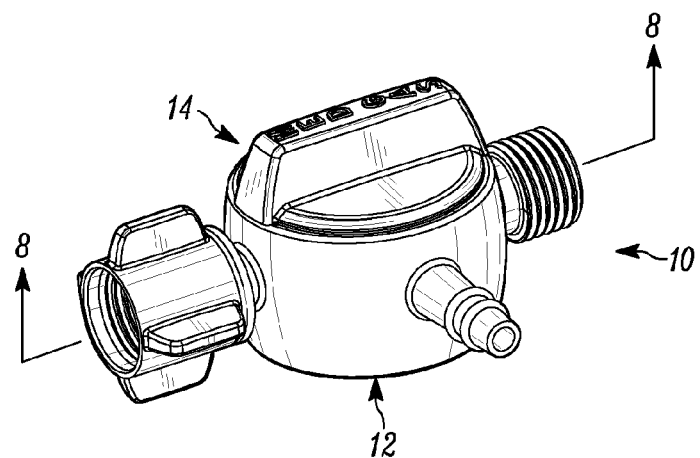
FIG. 1 of the drawings is a perspective view of the flow diverter valve of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the flow diverter is shown generally at 10. The flow diverter is well suited for use in the medical environment to direct an inflow of various fluids (such as air and oxygen among others) to one of two (or more separate outlets. The diverter has a minimal amount of components and relies on a minimal amount of seals to effectuate a full diversion of flow between two outlets. It is preferred that the flow diverter is formed from an plastic member, such as an ABS plastic, while other plastics are likewise contemplated for use.

Figure 2:
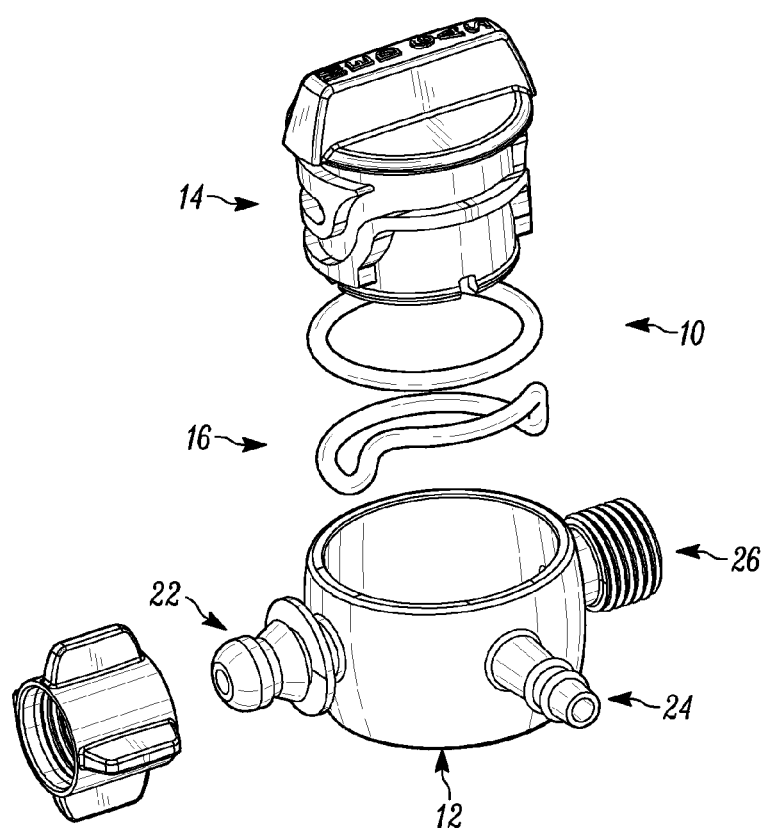
FIG. 2 of the drawings is a exploded perspective view of the flow diverter valve of the present disclosure.
Figure 3:
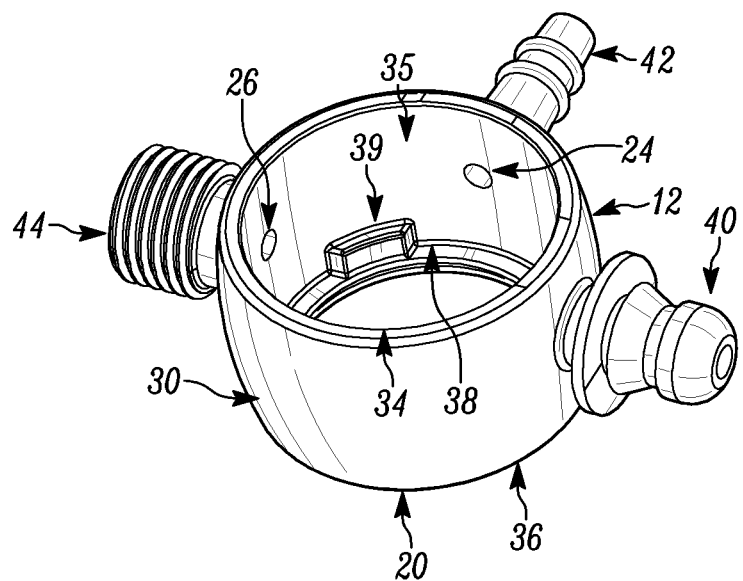
FIG. 3 of the drawings is a perspective view of the outer housing of the flow diverter valve of the present disclosure.
Figure 4:
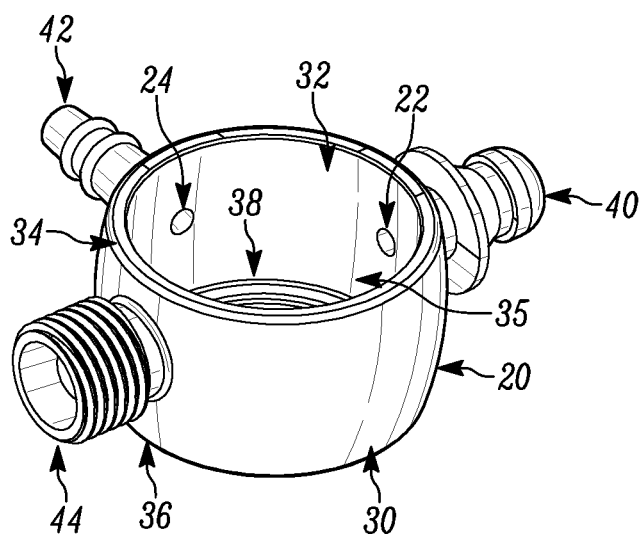
FIG. 4 of the drawings is a perspective view of the outer housing of the flow diverter valve of the present disclosure.

The flow diverter 10 is shown in more detail in FIGS. 1 and 2, includes outer housing 12, flow selector valve 14 and seal members 16. It will be understood that the outer housing 12 (with the exception of items coupled to the outlet openings) and the flow selector valve 14 are each preferably monolithic, integrally molded members, which minimizes forming and assembly while enhancing durability. It will be understood that it is contemplated that the outer housing and the flow selector valve may each be formed from several components which are coupled together through various means (i.e., gluing, fusing, fastening and the like). With more specific reference to FIGS. 3 and 4, the housing 12 includes body 20, inlet opening 22, first outlet opening 24 and second outlet opening 26. Body 20 includes outer surface 30, inner surface 32 and those surfaces span between front edge 34 and back edge 36. The housing is substantially circular in configuration with the outer surface being slightly convex so as to have the appearance of a spherical segment which is centered at the midpoint between the front edge and the back edge. Of course, other shapes are contemplated for the outer surface, as well as different outer surface configurations.

The inner surface which has a hooplike configuration comprises a generally cylindrical configuration which is generally substantially planar between the front edge 34 and the back edge 36 so as to have a generally uniform diameter between the front and back edges 34, 36. The inner surface defines a hoop-like cavity 35. A flange 38 is disposed at or near the back edge 36, which projects inwardly from the inner surface. Similarly, an inner rotational stop is disposed on the inner surface between the flange 38 and the front edge 34. As will be explained below, the flange 38 serves to provide increased rigidity as well as an interface with which to retain the flow selector valve 14. The rotational stop, together with structures on the flow selector valve 14 define the rotational limits of the flow selector valve relative to the outer housing.

The inlet opening 22 extends through body 20 in an orientation that is generally perpendicular to the surface such that an axis can be defined by the inlet opening that extends through the center of the circle defined by the body 20. The first outlet opening 24 extends through body 20 at a location that is spaced apart from the inlet opening 22. Similarly, the second outlet opening 26 extends through the body 20 at a location that is spaced apart from the inlet opening 22. The three openings 22, 24 and 26 are all spaced generally midway between the front edge 34 and the back edge 36. In addition, the openings are separated from each other at approximately 90° so that the inlet is separated from the first outlet by 90° and the first outlet is separated from the second outlet by 90°.

The inlet opening 22 includes inlet fitting 40 which extends outwardly from the outer surface 30 of the body 20. In the embodiment shown, the fitting comprises a compression type fitting.

First outlet opening 24 includes first outlet fitting 42 which extends outwardly from the outer surface 30 of the body 20. In the embodiment shown, the fitting 42 comprises an outwardly conically shaped member having a plurality of sealing barbs disposed thereon. Such fittings are commonly utilized with resilient hoses and the like. Second outlet opening 24 includes second outlet fitting 44 which extends outwardly from the outer surface 30 of body 20. In the embodiment shown, the fitting 40 comprises a cylindrical member having a threadform extending about the outer surface thereof. It will be understood that the threadform substantially dimensionally corresponds to commonly utilized fittings in the industry.

It will be understood that the disclosure is not limited to any particular orientation of the inlet and the outlet openings. It will be understood that they may be spaced apart from each other in different orientations. In addition, it will be understood that utilizing the principles of the present invention, additional outlets may be provided, as well as additional outlets. It is still further understood that different fittings may be utilized, other than those that are shown. In certain embodiments, each fitting may be identical, whereas in other embodiments each fitting may be distinct. Specific fittings can be configured for specific applications.

Figure 5:
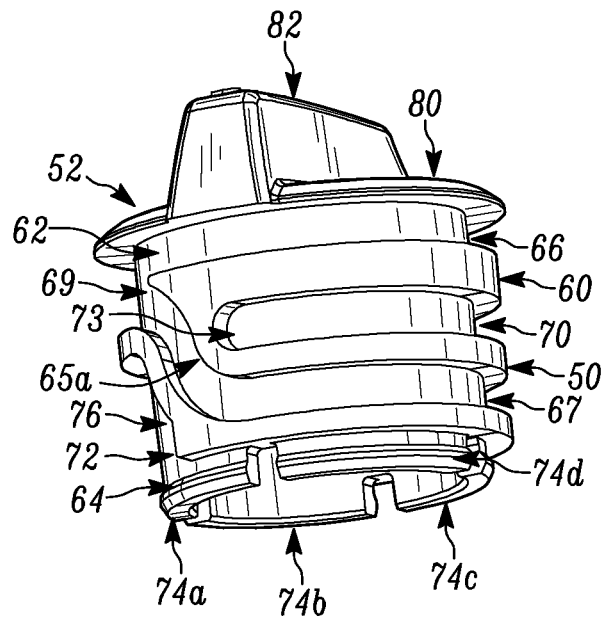
FIG. 5 of the drawings is a perspective view of the flow selector valve of the flow diverter valve of the present disclosure.
Figure 6:
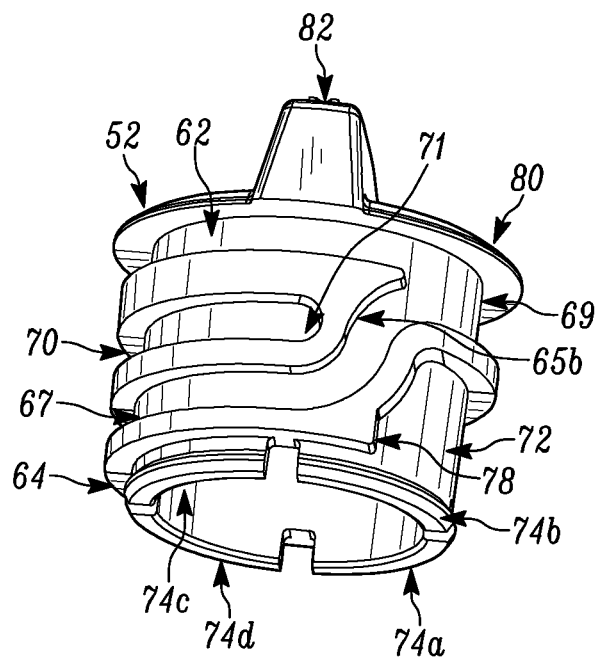
FIG. 6 of the drawings is a perspective view of the flow selector valve of the flow diverter valve of the present disclosure.

The flow selector valve 14 is shown in FIGS. 5 and 6 as comprising cylindrical body 50 and top cap 52. The cylindrical body 50 includes outer surface 60 having proximal end 62 and distal end 64. The flow selector valve 14 is configured to shape-matingly engage within the operating cavity 35 defined by the body of the housing in a generally tight abutment. The flow selector valve rotates about an axis that is generally orthogonal to the inner surface of the outer housing (i.e., approximately the center of the hooplike inner surface of the outer housing).

An upper planar groove 66 is disposed into the outer surface 60 proximate the proximal end 62 of the outer surface. A lower non-planar groove 68 is likewise disposed into the outer surface 60 spaced below the upper planar groove. The lower non-planar groove 68 includes an lower portion 67, upper portion 69 and transition portions 65a, 65b. The lower portion extends about approximately half of the outer surface near the distal end 64 and generally parallel to the upper planar groove. The upper portion 69 likewise extends about approximately half of the outer surface near the proximal end, and substantially merges with the upper planar groove 66, along a portion thereof. The transition portions 65a, 65b span between the lower portion and the upper portion, joining the two portions on either end. The two transition portions 65a, 65b are on opposing sides of the outside surface, and in the embodiment shown, substantially 180° apart.

An upper diverter channel 70 is defined between the upper planar groove 66 and the lower non planar groove 68, and is more specifically bound by the upper planar groove 66, the lower portion 67 of the lower non planar groove 68 and the transition portions 65a, 65b. The upper diverter channel extends approximately 180° about the outer surface 60 of the cylindrical body 50, form a first end 71 to a second end 73. The upper diverter channel is sized so as to be able to span between the inlet opening 22 and the second outlet opening 26 when the flow selector valve is in a particular configuration. It will be understood that the upper diverter channel 70 may be spaced apart from the grooves 66, 68 by a ridge therebetween. The ridge has a substantially tight fitting against the inside surface of the body of the outer housing, to additionally limit the air that exits from the upper diverter channel.

A slot 72 is defined between the upper portion 69 of the lower non-planar groove 68, the distal end 64 of the cylindrical body and the transition portions 65a, 65b and includes first orientation stop 76 and second orientation stop 78. The lower flow diverter channel extends approximately 90° about the outer surface of the cylindrical body 50. The first orientation stop 76 and the second orientation stop 78 interface with the inner stop 39 of the body of the outer housing and preclude further rotation of the flow selector valve. As the channel is approximately 90°, the rotation of the flow selector valve is approximately the same rotational arcuate distance. It will be understood that in different embodiments, the position of the first orientation stop and the second orientation stop can be altered, as can the configuration of inner stop 39 to effectuate a smaller or larger operational rotational arc.

The retaining clips 74a-74d are positioned at the distal end 64 of the cylindrical body 50. As will be explained, these clips flex and extend beyond the flange 38 of the back edge 36 of the housing 20 and then are retained on the opposing side of flange 38, which, in turn, keeps the flow selector valve 14 coupled to the outer housing, yet rotatable within the operating cavity 35. While these retaining clips are integrally formed, the retaining clips may be a separate component which is coupled to the cylindrical body 50.

The top cap 52 is positioned at the proximal end 62 of the cylindrical body 50, and would extend outside of the body 20 of the outer housing 12. In the embodiment shown, the top cap 52 is integrally formed with the cylindrical body. The top cap includes top surface 80 and selector grip 82. The selector grip 82 allows for the manipulation and rotation of the flow selector valve 14 when in operable configuration within the operating cavity 35 of the outer housing 12. The selector grip may include indicia or symbols, such as MED GAS, OXY GAS, OXYGEN, AIR or the like, without limitation.

The seal members 16 are shown in FIG. 2 as comprising upper seal 90 and lower seal 92. The upper and lower seals comprise conventional o-rings (FIG. 8) which have a substantially planar circular hoop-like configuration, and with the seal having a substantially circular cross-sectional configuration. The upper seal 90 is positioned within the upper planar groove 66 and the lower seal is positioned within the lower non-planar groove. It will be understood that the lower seal, while initially planar, is directed into the non-planar groove. As the upper planar groove 66 and the upper portion 68 of the lower non-planar groove 70 substantially merge, the upper seal 90 and the lower seal 92 abut and can form a seal therebetween.

To assemble the flow diverter 10, an outer housing 12 is provided along with the flow selector valve 14 and the seal members 16. Initially, the seal members 16 are coupled to the flow selector valve 14. Specifically, the upper seal 90 is directed into the upper planar groove 66. The lower seal 92 is directed into the lower planar groove 68. Once the two seals have been seated in the grooves, the flow selector valve 14 can be introduced into the outer housing 12.

Specifically, the flow selector valve 14 is pushed into the operating cavity 35 of the body 20 of the outer housing 12 with the distal end 64 first. It will be understood that the seals form a fluid-tight seal between the inner surface 32 of the body of the outer housing 12 and the outer surface 60 of the cylindrical body 50. Eventually, the retaining clips 74a-74d interface with the flange 38 and extend beyond the flange 38, thereby securing the flow selector valve 14 to the outer housing 12.

When inserted correctly, the inner stop 39 is positioned within the slot 72 such that the rotation of the flow selector valve 14 is limited by the first orientation stop 76 and the second orientation stop 78. In the embodiment shown, the flow selector valve 14 can rotate from a first orientation to a second orientation. In a first orientation, the selector grip 82 extends along the axis between the second outlet opening 26 and the inlet opening 22, and the inner stop 39 abuts the first orientation stop 76. In the second orientation, the selector grip is substantially perpendicular to an axis between the second outlet opening and the inlet opening, and the inner stop abuts the second orientation stop 78. In turn, it will be understood that the rotation of the top cap 52 was approximately 90°.

As explained above, in certain embodiments, the amount of rotation can be varied to be greater or lesser. Additionally, the range can be at any orientation relative to the inlet and the outlets (with the selector grip 82 being in any orientation relative to the inlet opening and the outlet openings). It will also be understood that marks may be positioned on the outer housing to indicate the end of rotational travel of the flow selector valve relative to the outer housing. Further, marks can be utilized to delineate operational and non-operational orientations of the cylindrical body with the outer housing (i.e., through red touch pads or the like where non-functional orientations lie).

Once assembled, the device is ready for use. Initially, a source of air (or other fluid) is coupled to the inlet opening, and in particular to the inlet fitting 40. Similarly, devices requiring a supply of air (or other fluid) is coupled to the first and second outlet openings 24, 26. It will be understood that it is necessary to divert the air from the inlet opening to one of the two outlet openings.

Figure 7:
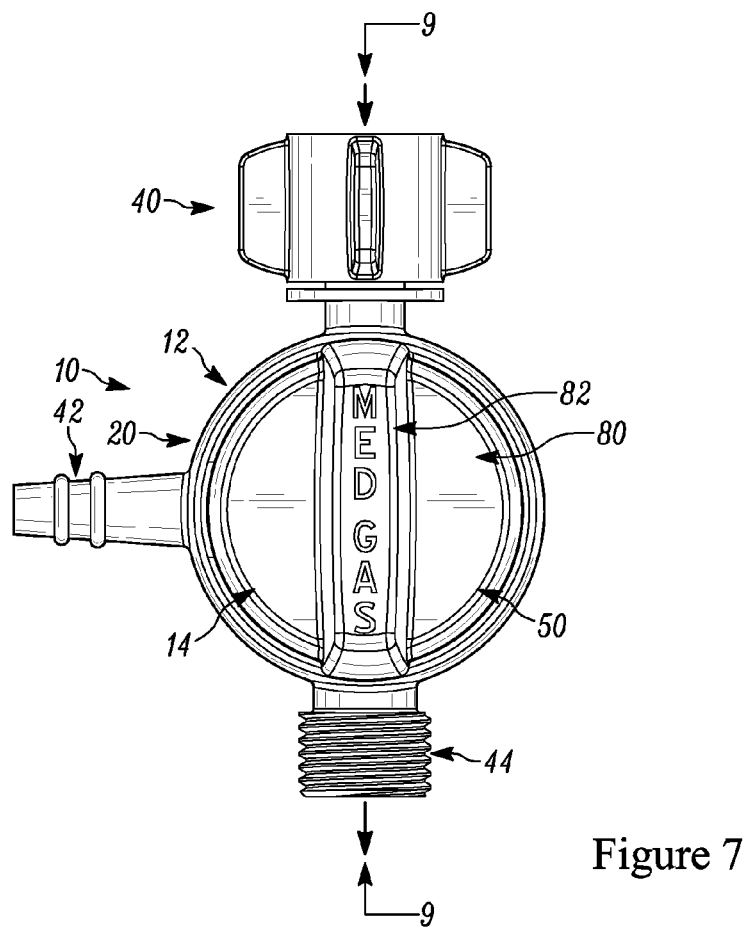
FIG. 7 of the drawings is a top plan view of the flow diverter apparatus of the present disclosure, showing, in particular, a first orientation.
Figure 8:
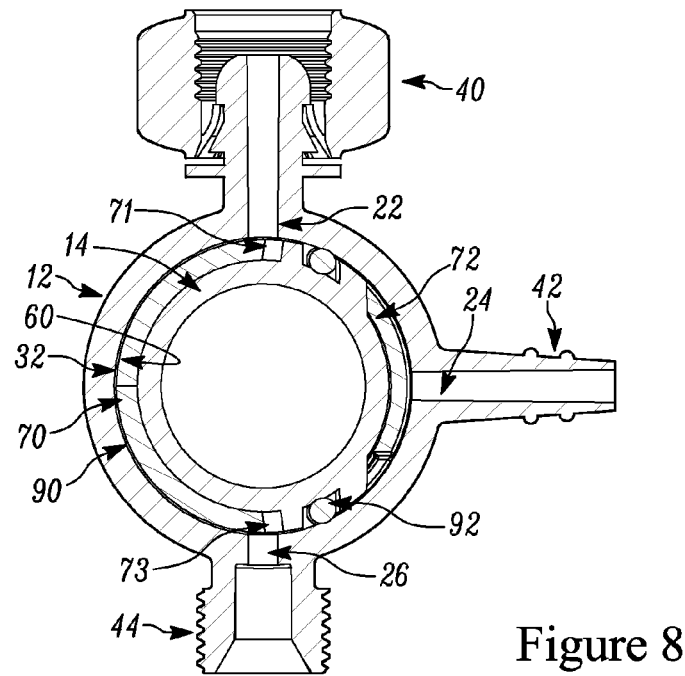
FIG. 8 of the drawings is a cross-sectional view of the flow diverter apparatus of the present disclosure, taken generally about lines 8-8 of FIG. 1.
Figure 9:
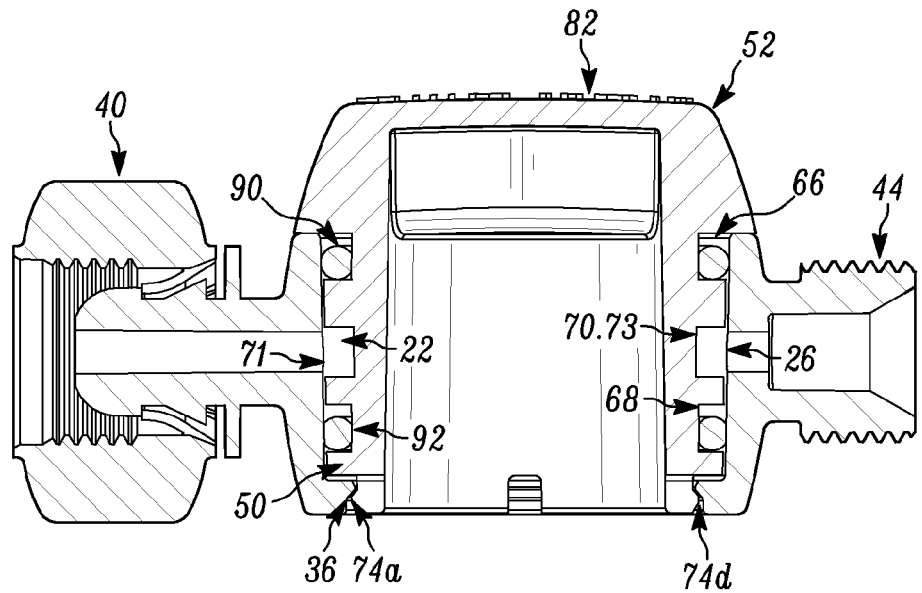
FIG. 9 of the drawings is a cross-sectional view of the flow diverter apparatus of the present disclosure, taken generally about lines 9-9 of FIG. 7.

Regardless of the device that is coupled to the inlet and the two outlets, in one exemplary embodiment, the flow diverter 10 will typically initially begin in one of the two configurations, typically, and by way of example, with the flow selector valve 14 being in the first orientation, as is shown in FIGS. 7-9. In such an orientation, the selector grip 82 lies along an axis formed by the inlet opening and the second outlet opening. In such a configuration, the upper diverter channel 70 spans between the inlet opening 24 and the second outlet opening 26 so that the two are in fluid communication with each other. The inlet opening 24 is proximate the first end 71 of the upper diverter channel 70. The second outlet opening 26 is proximate the second end 73 of the upper diverter channel. 70. Finally, in such an orientation, the inner stop 39 abuts the first orientation stop 76.

Figure 10:
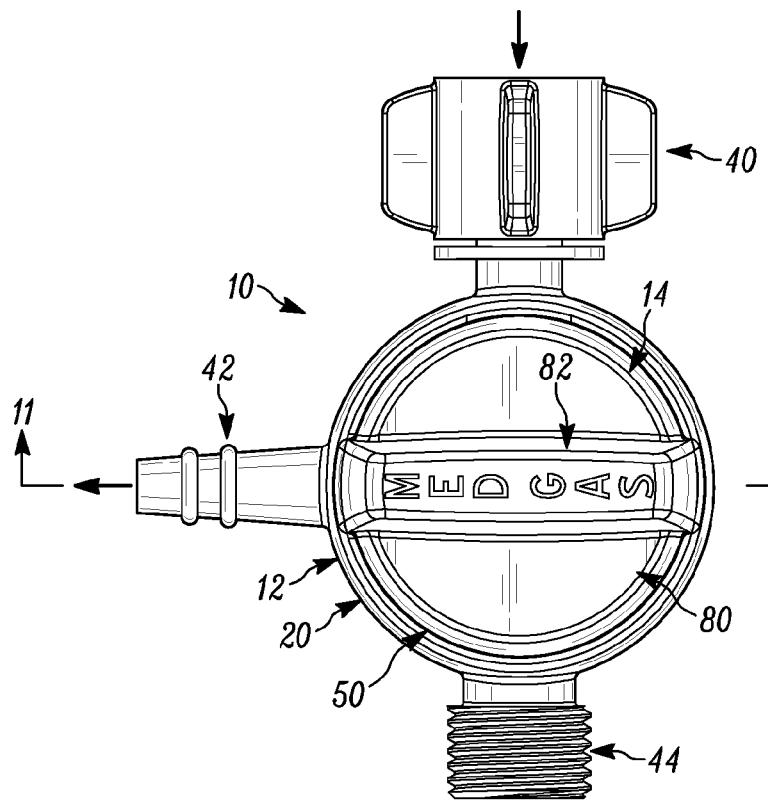
FIG. 10 of the drawings is a top plan view of the flow diverter apparatus of the present disclosure, showing, in particular, a second orientation.
Figure 11:
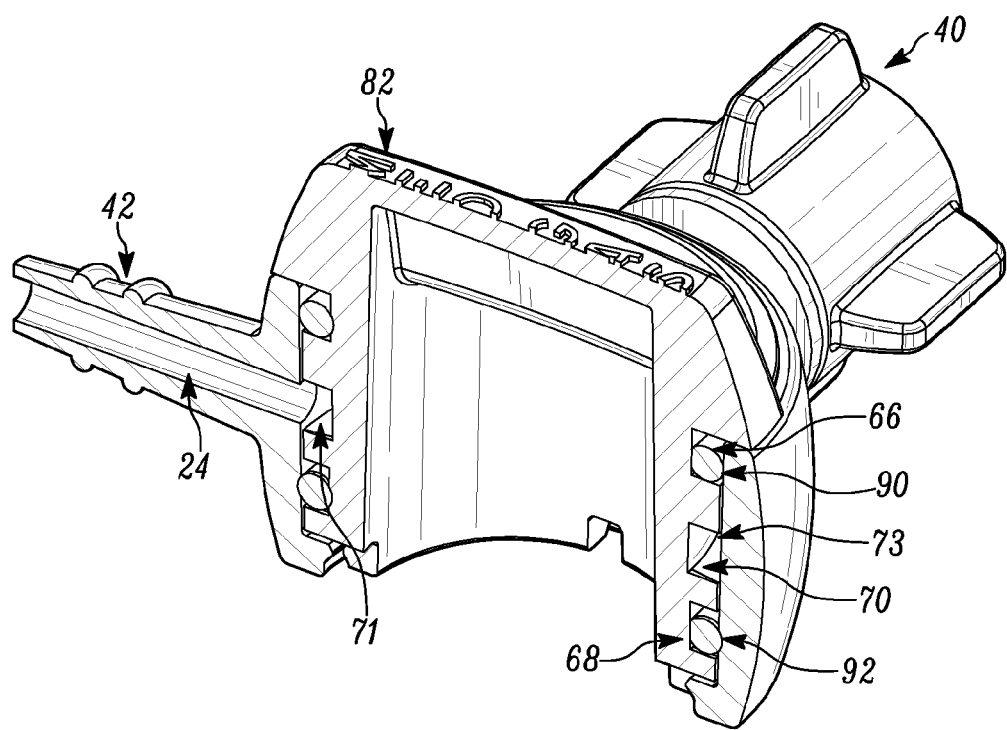
FIG. 11 of the drawings is a cross-sectional view of the flow diverter apparatus of the present disclosure, taken generally about lines 11-11 of FIG. 10.

To divert the flow to the first outlet opening (i.e., to place the flow selector valve in the second orientation as is shown in FIGS. 10 and 11), the user rotates the cylindrical body 50 of the flow selector valve 14 relative to the outer housing 12 in a counter-clockwise direction. As the first outlet opening is proximate the second end 73 of the upper diverter channel 70, even a slight initial rotation of the flow selector valve 14 moves the upper diverter channel 70 away from the second outlet opening 26, and toward the lower seal 92 (virtually immediately greatly reducing the flow of fluid to the second outlet). Eventually the lower seal 92 passes beyond the second outlet opening, such that the second outlet opening 26 is not positioned between the upper seal and the lower seal.

Continued rotational movement of the flow selector valve, directs the lower seal 92 to traverse the first outlet opening so that the first outlet opening is positioned between the lower seal and the upper seal. As the end of rotational travel is reached (i.e., when the inner stop 39 abuts the second orientation stop 78), the first outlet opening is placed in fluid communication with the upper diverter channel proximate the first end 71 thereof, which has maintained fluid communication with the inlet opening throughout (as the inlet opening is, in the second orientation, approximately midway between the first end 71 and the second end 73 of the upper diverter channel 70. As such, the fluid from the inlet is then directed through the first outlet opening, and the second outlet opening is on the opposite side of the seal members, and thus, fluidly isolated from the inlet opening, or the second outlet opening.

When it is desired that fluid again be directed to the second outlet opening, the procedure is merely reversed. Specifically, the flow selector valve is rotated in a clockwise direction which displaces the upper diverter channel from the first outlet opening and eventually, the first outlet channel traverses beyond the lower seal and is thus no longer positioned between the two seals. Continued rotation directs the lower seal beyond the second outlet opening and eventually reintroduces the second end 73 of the upper diverter channel to the second outlet opening, such that they are again in fluid communication.

The user can manipulate the flow selector valve 14 between the first orientation (FIGS. 7 through 9) and the second orientation (FIGS. 10 and 11) as desired, through a simple rotation of the cylindrical body 50 through manipulation of the selector grip 82. Advantageously, with the selector grip 82 as described, and the positioning, the selector grip essentially lies along an axis defined by the outlet through which fluid from the inlet is directed. Thus, even a cursory observation can lead to a quick determination as to the position of the flow selector valve.

It will be understood that, advantageously, the diversion of flow is accomplished through two substantially planar seal members (i.e., o-rings and the like), one of which is positioned within the non-planar groove. Such an orientation allows for the simple rotation of the cylindrical body relative to the outer housing to effectuate a diversion of flow between two outlets, much like a spool valve.

Additionally, the configuration of the lower non planar groove, and in particular, the transition portions that transition from the upper portion to the lower portion substantially precludes twisting and rolling of the lower seal 92 upon rotation thereof, which would inadvertently damage the lower seal.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:
1. A flow diverter comprising:
an outer housing including:
a body having a hooplike configuration with an inner surface, and spanning from a front edge to a back edge, the body defining an operational cavity which is substantially bound by the inner surface and the front edge and back edge;
an inlet opening extending through the inner surface and into the operational cavity, a first outlet opening extending through the inner surface and into the operational cavity and, a second outlet opening extending through the inner surface and into the operational cavity, the inlet opening, the first outlet opening and the second outlet opening being radially spaced apart from each other;
a flow selector valve positionable within the operational cavity and rotatable relative to the outer housing within the operational cavity about an axis that is generally orthogonal to the inner surface of the body, and including:
an outer surface which shape matingly engages the inner surface of the body;
an upper groove extending into the outer surface of the flow selector valve proximate a proximal end thereof; and
a lower non-planar groove extending into the outer surface of the flow selector valve, the non-planar groove having a lower portion positioned proximate a distal end of the body, an upper portion positioned proximate the upper groove, and opposing transition portions transitioning between the upper portion and the lower portion, wherein the inlet and the first and second outlets are positioned between the lower portion of the lower non-planar groove and the upper groove;
wherein a diverter channel is formed in the outer surface and is bound by the upper groove and the lower non-planar groove, the diverter channel rotationally positionable in at least a first orientation wherein the second outlet opening and the inlet opening are each in fluid communication with the diverter channel, and the first outlet opening is fluidly isolated therefrom, and a second orientation wherein the inlet opening and the first outlet opening are in fluid communication with the diverter channel, and the second outlet opening is fluidly isolated therefrom; and
an upper seal member positioned within the upper planar groove, and a lower seal member positioned within the lower non-planar groove, and sealingly engaging the inner surface of the outer housing.

2. The flow diverter of claim 1 wherein the upper portion and the lower portion of the lower seal are substantially parallel to the upper seal, and wherein the upper seal is substantially planar.

3. The flow diverter of claim 1 wherein the upper portion of the lower non planar groove merges with a portion of the upper groove.

4. The flow diverter of claim 1 wherein the upper seal and the lower seal comprise o-rings.

5. The flow diverter of claim 1 wherein the inlet opening is spaced approximately 180° from the second outlet opening and spaced approximately 90° from the first outlet opening.

6. The flow diverter of claim 5 wherein the flow selector valve includes a top cap having a selector grip which facilitates the rotation thereof relative to the outer housing, the selector grip having an indicator as to which of the first outlet opening and the second outlet opening is in fluid communication with the inlet opening.

7. The flow diverter of claim 1 wherein each of the inlet opening, first outlet opening and second outlet opening each include a fitting associated therewith, each fitting providing coupling with an outside device.

8. The flow diverter of claim 7 wherein each fitting has a different configuration.

9. The flow diverter of claim 1 wherein the flow selector is rotated approximately 90° between the first orientation and the second orientation.

10. The flow diverter valve of claim 1 wherein the body includes an outer surface that comprises a spherical segment, substantially centered about the midpoint between the front edge and the back edge.

11. The flow diverter valve of claim 1 wherein the body further includes a flange positioned proximate the back edge and the flow selector valve includes at least one retaining clip which engages with the flange so as to maintain the flow selector valve within the operating cavity of the outer housing.

12. The flow diverter valve of claim 1 wherein the body further includes an inner stop which cooperates with a slot positioned on the outer surface of the flow selector valve, to, in turn, limit rotation of the flow selector valve relative to the outer housing between the first orientation and the second orientation.

13. The flow diverter valve of claim 1 wherein the inner surface is substantially cylindrical with the outer surface of the flow selector valve being substantially cylindrical.

14. The flow diverter valve of claim 13 wherein the inlet opening, the first outlet opening and the second outlet opening are positioned substantially midway between the front edge and the back edge of the inner surface of the outer housing.

* * * * *